April 16, 1929.　　　　F. F. FORSHEE　　　　1,709,664
ELECTRIC RANGE CONSTRUCTION
Filed Dec. 29, 1925　　　3 Sheets-Sheet 2
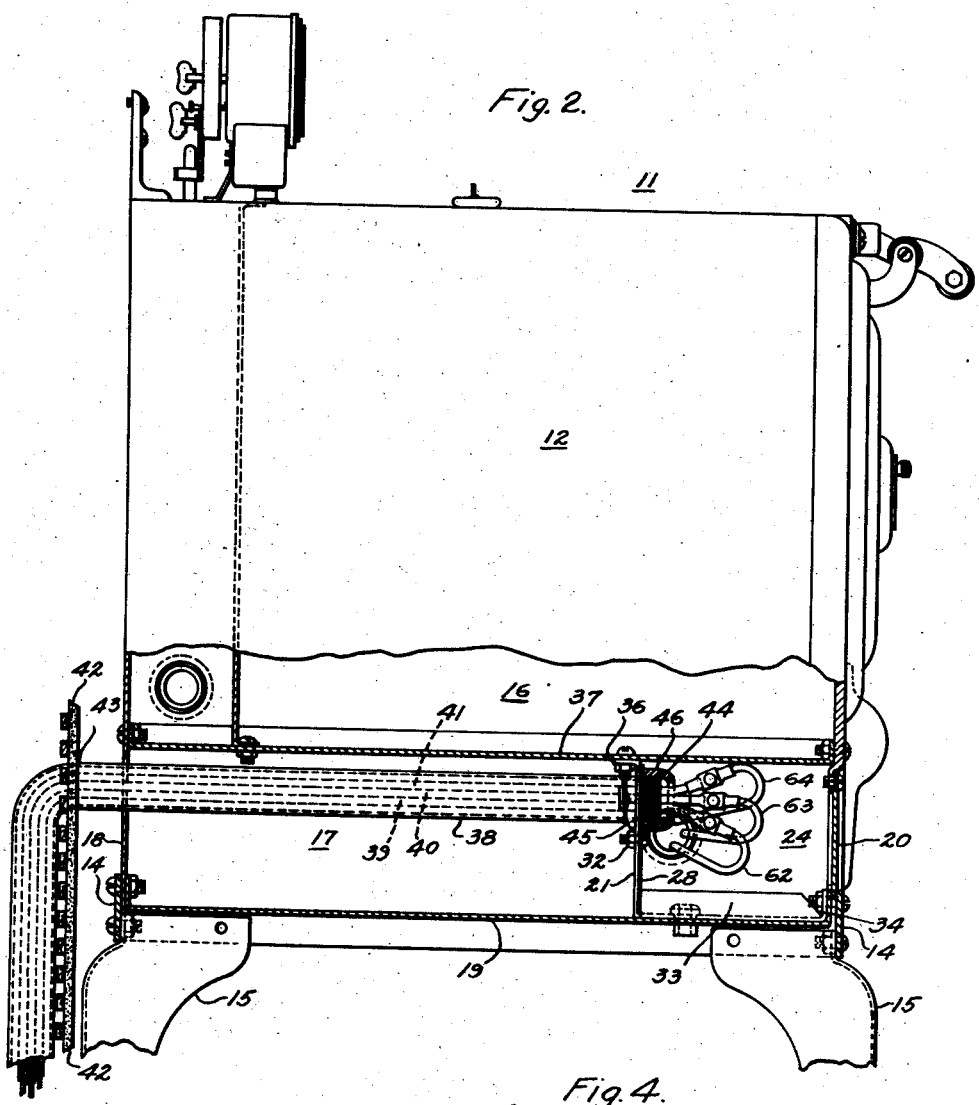
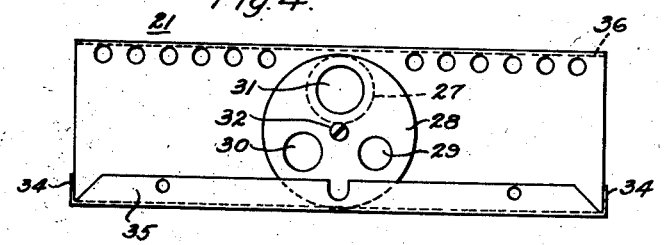
WITNESSES:　　　　　　　　　　　　　　INVENTOR
　　　　　　　　　　　　　　　　　Frank F. Forshee.
　　　　　　　　　　　　　　　BY
　　　　　　　　　　　　　　　　　　　ATTORNEY

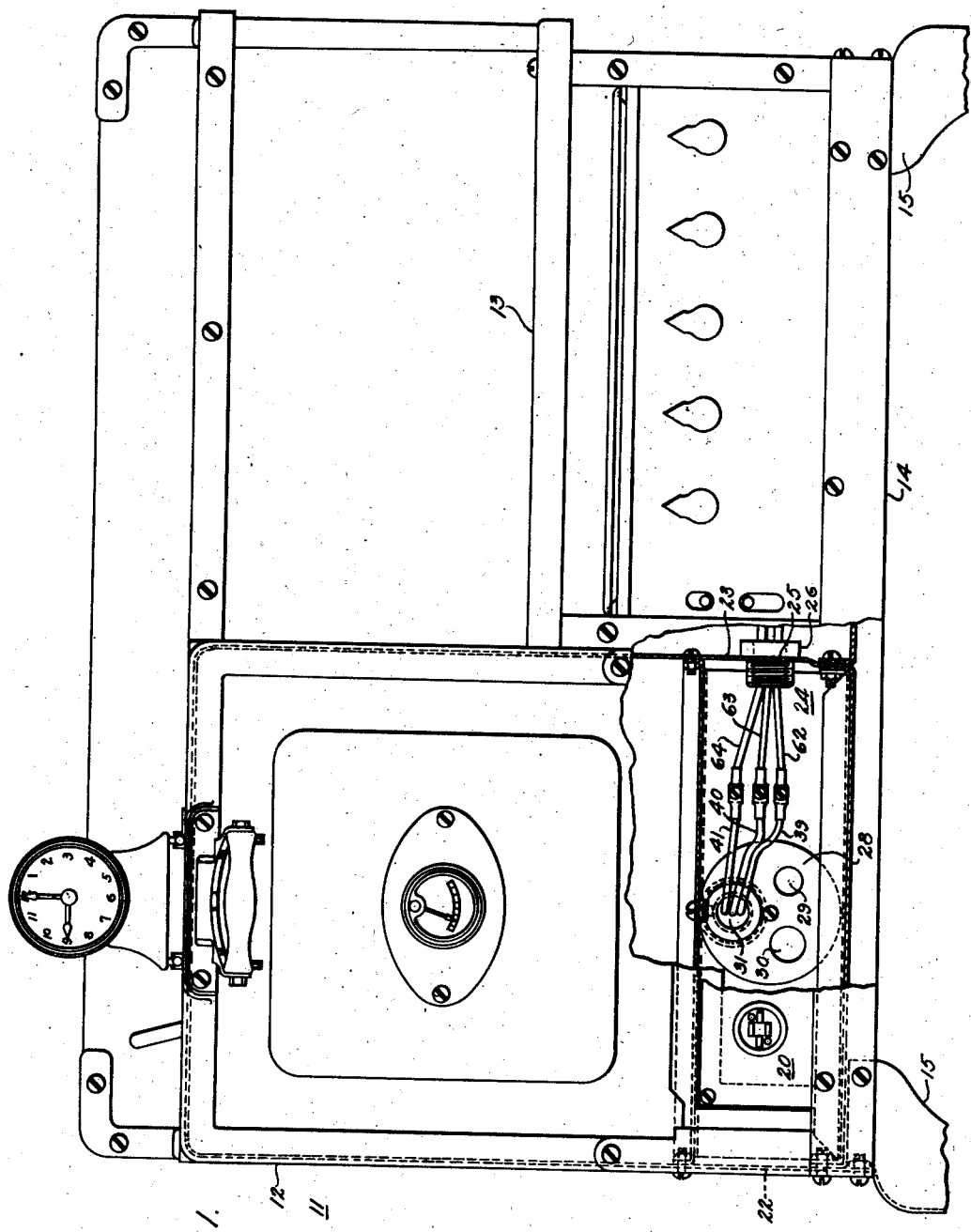

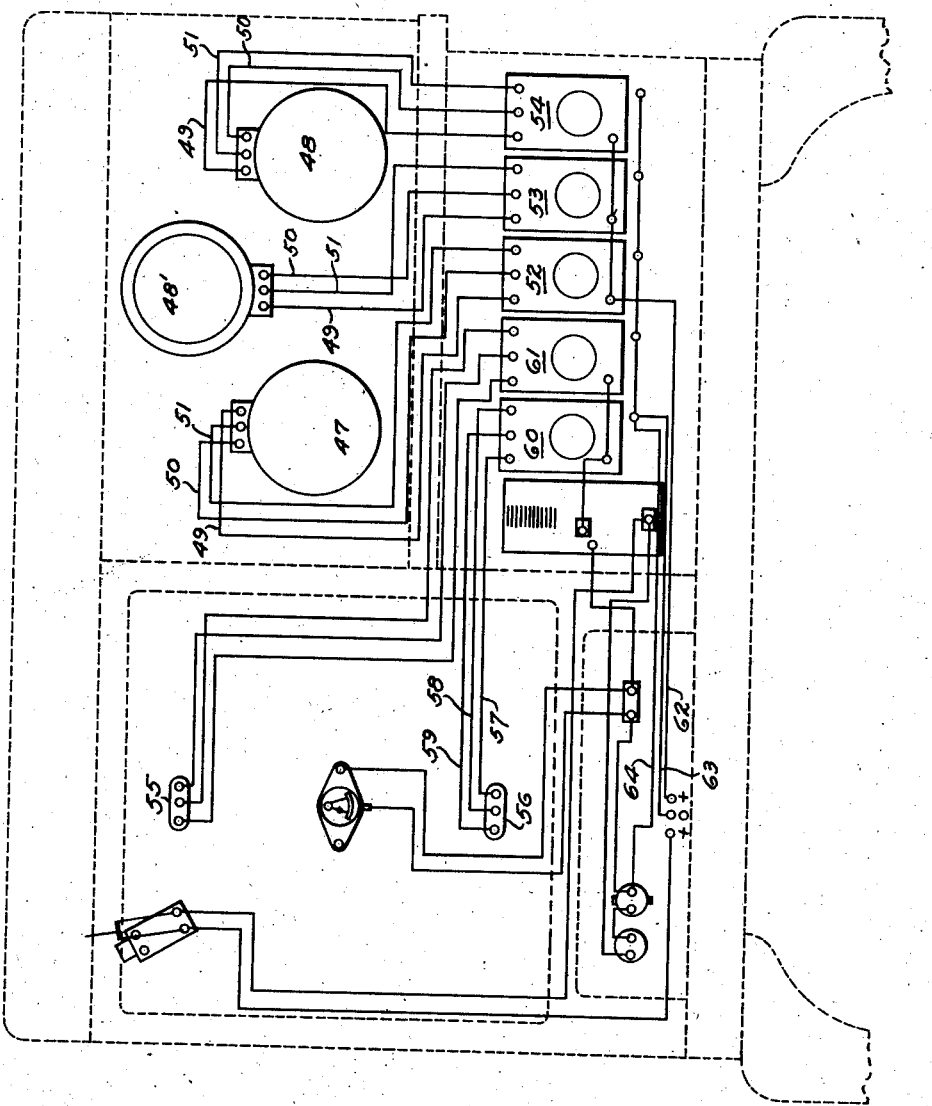

Patented Apr. 16, 1929.

1,709,664

UNITED STATES PATENT OFFICE.

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

ELECTRIC-RANGE CONSTRUCTION.

Application filed December 29, 1925. Serial No. 78,100.

My invention relates to electric ranges and particularly to means for connecting electric power supply conductors thereto.

An object of my invention is to provide means for connecting an electric range to an electric power supply circuit that shall be unified and simple in construction.

Another object of my invention is to provide means for connecting an electric range to an electric power supply circuit, that shall be substantially permanent, in order that said range may be moved thereto and connections made conveniently.

In practicing my invention, I provide an electric range comprising an oven member and a stove member, each of which has electric heating units and individual switches therefor. The switches are connected to common bus bars or conductors that terminate in a terminal bus. I also provide a conduit or pipe, in which the supply conductors are located, which may be installed permanently in a desirable or convenient location, in order that the range may be moved up to and over the pipe and the conductors connected to a range terminal box. I also provide a removable front cover for said terminal in order that the aforesaid bus bars and conductors within the conduit may be connected properly and conveniently.

In the accompanying sheets of drawings,

Figure 1 is a front elevational view, partially in section, of an electric range embodying my invention, Fig. 2 is an end view of the range structure illustrated in Fig. 1.

Fig. 3 is an end view of a wall member illustrated in Figs. 1 and 2,

Fig. 4 is a front view of the device illustrated in Fig. 3, and

Fig. 5 is a schematic diagram of the electric connections employed in the device illustrated in Figs. 1 and 2.

Referring more particularly to Fig. 1, an electric range structure 11 comprises generally, an oven member 12 and a stove structure 13, a supporting base 14 and supporting legs 15 attached thereto.

The oven member 12 comprises an oven chamber 16 and a compartment 17 located beneath the oven chamber 16. The compartment 17 has a rear wall 18, a bottom 19, a removable front wall 20 and an intermediate wall 21 substantially as illustrated in Fig. 2.

The compartment 17 also has side walls 22 and 23.

The bottom 19 and the walls 20, 21 and 23 enclose a compartment 24 which is more conveniently called a terminal box. The wall 23 of the terminal box 24 has an opening 25 in which a bushing 26 is inserted. The intermediate wall 21 has an opening 27, illustrated by a dotted circle in Fig. 4 and has a pivotally mounted disc or plate member 28 thereon which has openings 29, 30 and 31 therein. The center of the openings 29, 30 and 31 are so spaced from a pivot 32 that the center of said openings coincide with the center of the opening 31. The intermediate wall 21 has a laterally extending portion 33, having unturned portions 34 and 35 at the edges thereof, and a laterally extending portion 36. The laterally extending portion 36 is bolted to an oven wall 37 and the laterally extending portion 34 is bolted to the base 14 of the main structure illustrated in Figs. 1 and 2.

In Fig. 2, I have illustrated means by which electrical supply conductors may be brought into the compartment 24. The means comprises a pipe or conduit 38 that has a plurality of conductors 39, 40 and 41 located therein. The conduit member 38, as shown in Fig. 2, is brought in from a power supply line (not shown) and enters a building and threads between the walls thereof, a portion only of an inner wall 42 of which is illustrated in Fig. 2. The conduit 38 leaves the wall 42 at 43 and extends horizontally into the range structure 11. The end of the conduit 38 has a threaded portion 44 and a pair of threaded nuts 45 and 46 are provided whereby the wall member 21 may be clamped therebetween.

The pivotally mounted member 28 illustrated in Figs. 1, 2, 3 and 4 is provided with holes 29, 30 and 31 of different diameters in order that different sizes of conduit 38 may be used, depending on the limitations imposed by the voltage between the conductors 39, 40 and 41. The member 28 may be turned to cause one of its openings to register with the conduit 38 and thus facilitate installation of the range.

Referring to Fig. 5, the schematic diagram shows the arrangement of heating units in the stove member 13 and in the oven member 12. The stove member 13 has three units 47, 48 and 48', each connected by conductors 49, 50 and 51 to individual switches 52, 53 and 54. A pair of heating units 55 and 56 in the oven member 12 are connected by conductors 57, 58 and 59 to individual switches 60 and 61. The terminals 62, 63 and 64 of the switch members 60, 61, 52, 53 and 54 terminate in the terminal box 24. The supply conductors 39, 40 and 41 may then be connected to the conductors 62, 63 and 64 very conveniently by removing the front wall member 20.

From the aforesaid description, it is apparent that my invention will be very useful in wiring homes and particularly apartments of large apartment buildings for electric range service when the homes or the apartments are built. The conduit member 38 may be installed permanently, as illustrated in Fig. 2, and the range may be moved thereto and held firmly in place by the clamping nuts 45 and 46 illustrated in Fig. 2. Since the conduit 38 is preferably installed in the wall structure so that it enters the range from the rear, all wires entering the range will be located in metal covers, will be out of the way, and the danger of short circuits or broken leads to the range will be substantially eliminated. Then, too, it is evident that since the conduit 38 enters from the rear and projects through the intermediate wall 21, that all the connections of primary importance to the range as far as the supply conductors 39, 40, 41 are concerned, may be connected or disconnected from the front of the range by merely removing the front cover member 20.

By means of my invention, I have provided a simple and rugged means by which an electric range may be connected to a power supply circuit. The means comprises substantially a conduit member which is preferably installed between the walls of the building, while it is being constructed and is located in a suitable place in the room or compartment in which the range is to be located, and while I have shown it as entering the range from thereon, it may enter from the side. The conduit construction is permanent and is conveniently attached to the range. After it is once attached to the range, all wires connected to the range are out of the way and are sufficiently protected from moisture and from other injurious sources that may cause short circuits or broken leads.

Various modifications may be made in my invention without departing from the spirit and scope thereof. I, therefore, desire that only such limitations shall be placed thereon as shall be imposed by the prior art.

I claim as my invention:

1. In an electric range, the combination with an oven member, a stove member, electric heating units located in said members, and a terminal box structure, having an adjustable aperture therein, associated with said oven structure, of a conduit member located within a wall structure, having a laterally extending portion with an adjustable means at the end thereof for connecting said conduit member through the adjustable aperture to said terminal box.

2. The combination with an electric range structure comprising a box member, having a plurality of openings therein, an adjustable rear wall and a removable front wall, of a conduit member emerging from a wall structure, having an adjustable means on the end thereof for holding said conduit member in operative relation in one of said openings.

3. The combination with an electric range structure, comprising an integral box member having a removable front wall, an adjustable opening in a second wall thereof, and an opening in a third wall, of a conduit member, having a threaded portion at the end thereof, emerging from a wall structure and a clamping means, comprising a pair of nuts on said threaded portion, for holding said conduit member within said adjustable opening.

4. The combination with an electric range structure, comprising an integral box member, having a removable front wall, a pivotally mounted member having a pluraltiy of circular openings of different diameters therein which may be selectively alined with an opening in a second wall, and an opening in a third wall, of a conduit member having a threaded portion at the end thereof emerging from a wall structure and a clamping means, comprising a pair of nuts on said threaded portion, for holding said conduit member within one of said circular openings.

5. In an electric range, the combination with an oven member, a stove member, electric heating units located in said members, individual switches electrically connected to said heating units, supply conductors connected to terminals on said switches, a terminal box structure associated with said oven member, having an adjustable opening and a second opening therein for the entrance of said supply conductors to the terminal box, of a conduit member located within a wall structure, having a laterally extending portion with an adjustable means at one end thereof for connecting said conduit member to said terminal box, and a plurality of electric supply conductors located in said conduit and terminating in said terminal box and connected to the first named supply conductors.

In testimony whereof, I have hereunto subscribed my name this 27th day of Nov., 1925.

FRANK F. FORSHEE.